(12) United States Patent
Andersen

(10) Patent No.: US 6,645,593 B1
(45) Date of Patent: Nov. 11, 2003

(54) FIBREBOARD AND A METHOD OF MANUFACTURING IT

(75) Inventor: Carsten Andersen, Hasselager (DK)

(73) Assignee: www.ideandersen.dk ApS, Hasselager (*) Notice: Subject to any disclaimer, the term of this patent is extended or adjusted under 35 U.S.C. 154(b) by 37 days.

(21) Appl. No.: 09/857,973

(22) PCT Filed: Sep. 27, 2000

(86) PCT No.: PCT/DK00/00526

§ 371 (c)(1),
(2), (4) Date: Jul. 31, 2001

(87) PCT Pub. No.: WO01/26868

PCT Pub. Date: Apr. 19, 2001

(30) Foreign Application Priority Data

Oct. 14, 1999 (DK) .......................... 1999 01478

(51) Int. Cl.[7] ................................ B32B 3/02
(52) U.S. Cl. ....................................... 428/43
(58) Field of Search ............................. 428/43

(56) References Cited

U.S. PATENT DOCUMENTS

| | | | | |
|---|---|---|---|---|
| 4,397,898 A | * | 8/1983 | Ray | 428/43 |
| 5,004,636 A | * | 4/1991 | Parris | 428/43 |
| 6,083,594 A | * | 7/2000 | Weinstein et al. | 428/43 |
| 6,099,775 A | * | 8/2000 | Bargo et al. | 264/122 |

FOREIGN PATENT DOCUMENTS

| | | |
|---|---|---|
| DK | 152097 | 12/1998 |
| EP | 0159618 | 10/1985 |

\* cited by examiner

Primary Examiner—Alexander S. Thomas
(74) Attorney, Agent, or Firm—Dykema Gossett PLLC

(57) ABSTRACT

A fibreboard (4) formed by dry forming of a fibrous tissue (2) in a forming box (6) with subsequent heat treatment in an oven, wherein the fibres are selected from synthetic fibres, natural fibres or a mixture thereof, and wherein the fibreboard (4) is provided with rupture zones (30). The invention also relates to a forming box (6) for use in the manufacture of fibreboards (4), wherein the forming box (6) is arranged above a forming wire (14) which extends across a vacuum box (20). The object of the invention is to introduce rupture zones (30) in fibreboards (4) which are formed directly in the forming process, and that the gap (36) of the rupture zone is formed without the use of cutting tools. Hereby, fibreboards (4) can easily be adapted in width and length without the use of tools, while separation of the fibreboard (4) provides a regular rupture face ensuring that no thermal bridge is created at joints. The forming box (6) may be provided with vertical partitions (12) longitudinally of the forming wire (4) and sets of vertical partitions (13) transversely to the forming wire (14). The purpose of the partitions (12, 13) is to enable production of fibreboards (4) with incorporated rupture zones (30) or fibreboards (4) in independent webs/sections (58, 60).

14 Claims, 5 Drawing Sheets

FIBREBOARD AND A METHOD OF MANUFACTURING IT

Figure 1:
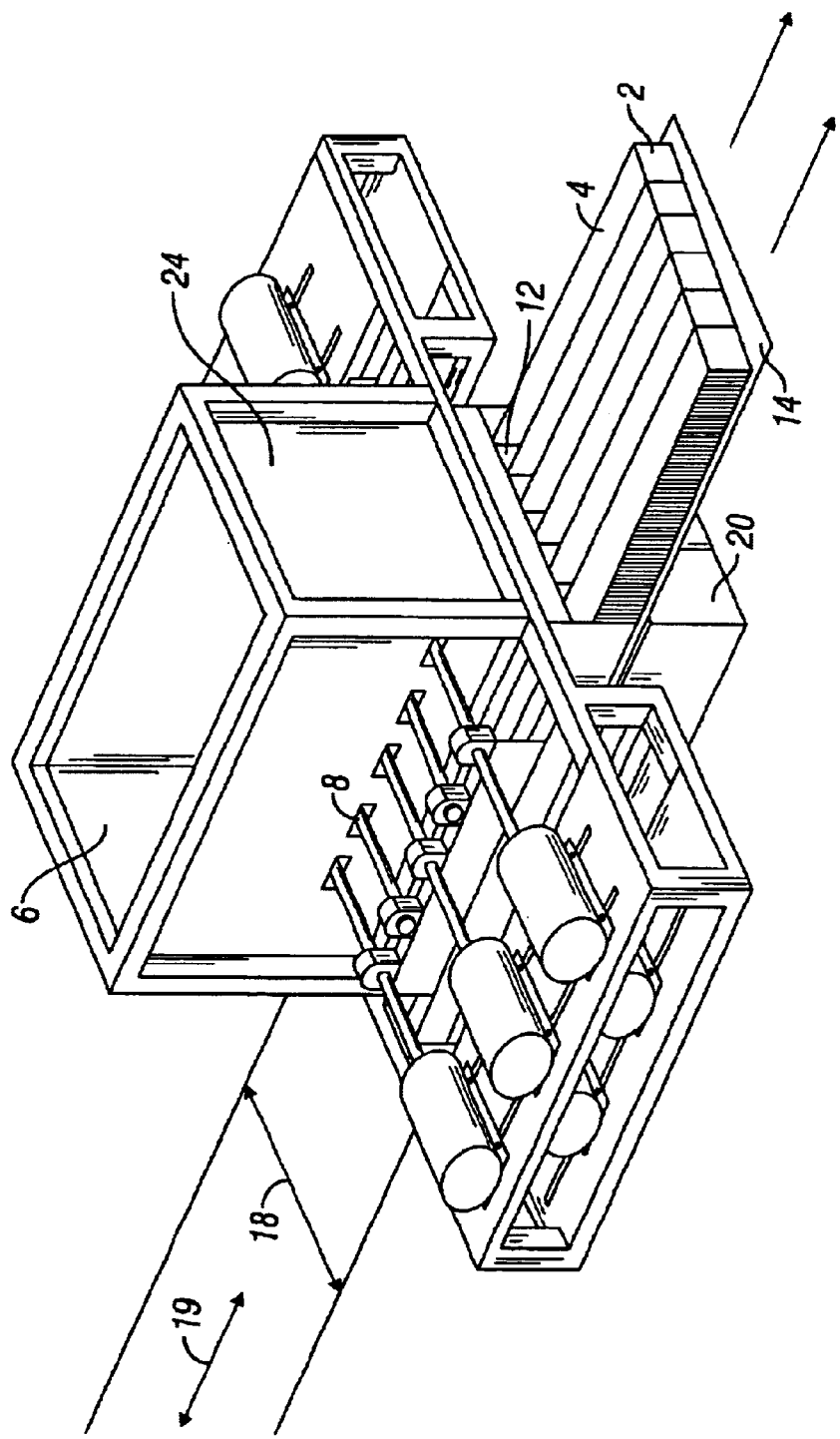

The invention relates to a fibreboard formed of a fibrous tissue by dry forming in a forming box and with subsequent fixing of fibres by heat treatment in an oven, wherein the fibres are selected from synthetic fibres, natural fibres or a mixture thereof, wherein the fibreboard consists of at least one layer of said fibres, wherein the thickness of the fibreboard and the density are adapted to the actual use, and wherein the fibreboard has rupture zones perpendicular to the surface of the fibreboard.

The invention also relates to a forming box for use in the manufacture of fibreboards formed of a fibrous tissue by dry forming in a forming box and with subsequent fixing of fibres by heat treatment in an oven, wherein the fibres are synthetic fibres, natural fibres or a mixture thereof, and wherein the forming box is arranged above a forming wire which extends across a vacuum box.

Danish Patent Application No. 1520/97, EP Patent Application No. 0 159 618 and U.S. Pat. No. 05,445,777 disclose various types of machines for the manufacture of boards of fibrous tissue. It is common to the known types of machines that all of them distribute fibres of some type so as to form a board-shaped fibrous tissue. The fibres are divided by rollers or other means constructed so that the fibres are distributed evenly and do not lump. These means may be constructed in many different ways, but all the machines are unique in that they are part of equipment that is used in the manufacture of boards, mats or sheets of relatively homogeneous fibrous tissue.

The object of the invention is to introduce rupture zones in the fibreboards, where rupture zones are formed directly in the forming process in such a manner that there are no through-going fibres in the rupture zone gap, and that the gap of the rupture zone is formed without the use of cutting tools.

Fibreboards are taken to mean boards made of fibres, such as e.g. insulation boards or insulation mats.

The fibreboard may be formed with rupture zones which extend in at least one direction, wherein the rupture zones consist of a gap having a height of between 10% and 100% of the thickness of the fibreboard, and wherein the forming of the fibreboard of a fibrous tissue directly provides rupture zones which do not have through-going fibres in the gap of the rupture zone, thereby forming a rupture zone gap without the use of cutting tools. The rupture zones ensure that the fibreboard/insulation mat may be adapted to the desired size within given intervals without the use of tools, since there are no through-going fibres in the rupture zone gaps. The fibrous tissue is kept together in the gaps as an effect of the heat treatment. At the same time, separation of the fibreboard results in a regular rupture face and optimum engagement face with any adjoining elements or adjoining fibreboards.

This facilitates handling of the product, since no tool of any type has to be used for performing an adaptation of the fibreboard/insulation mat. The regular rupture face ensures that a so-called thermal bridge is not created at the joint, that is an optimum insulation capacity is maintained at the joint.

The fibreboard may be made with rupture zones which extend in the longitudinal direction of the fibreboard as well as in transverse direction of the fibreboard. Rupture zones longitudinally of and transversely to the fibreboard make it easy to adapt the board in length as well as in width prior to final arrangement of the board.

The fibreboard may be made with a given distance between two rupture zones or between the rupture zone and the edge of the fibreboard in the order of up to half the board width. This provides the possibility of achieving a product which can be adapted in size within selected intervals easily and without difficulty.

The fibreboard may be made of natural fibres, such as animal hair, fibres from flax, hemp, jute, ramie, sisal, cotton, kapok, glass, stone, cellulose, newspaper, elephant grass, sphagnum, seaweed, palm fibres or the like.

All of these fibres have a certain insulating capacity that may be useful in various situations. Furthermore, it is possible to grow some of the mentioned vegetable fibres on ordinary agricultural areas.

The fibreboard may also be made of synthetic fibres, such as polyamide, polyester, polyacrylic, polypropene, two-component fibres or the like. Fibreboards made of synthetic fibres that can easily be adapted without the use of tools, may mean in the industry that a cutting step may be avoided in the production of e.g. diapers.

The fibreboard may also be made of a mixture of natural fibres and synthetic fibres, which involves the same advantages as mentioned above.

The fibreboard may moreover contain a fire-resistant substance. For example, it may be mentioned that the addition of ammonium phosphate can give the desired fire-resistant effect. It may be a requirement from various authorities that the product can withstand a specified fire test. Some of the mentioned fibres per se have a partial fire resistant property, while others require additional protection. Addition of a fire resistant substance, where necessary, provides optimum properties.

The forming box may be provided with at least one vertical partition which extends in the direction of movement of the forming wire and thereby essentially divides the forming box longitudinally, and wherein a set of vertical partitions are introduced transversely to the direction of movement of the forming wire and, in individual lengths, essentially correspond to the distance between the longitudinal partitions, said sets of transverse partitions being moved in the same direction and at the same rate as the forming wire, wherein the distance between the transverse sets of partitions is variable, and wherein the height of the transverse partitions is between 10% and 100% of the thickness in which the apparatus is set to produce the fibreboard, and wherein the forming box is constructed such that any fibres intended for the manufacture of fibreboards and adhering to the upper edge of the partition may be removed by movable means.

That the partitions are mounted longitudinally of the forming box in the direction of movement of the forming wire and transversely to the forming wire, respectively, in such a manner that the transverse partitions are advanced at the rate of the forming wire, means that it is possible to manufacture fibreboards/insulation mats with incorporated rupture zones in two directions for easier handling.

The forming box may be constructed such that any fibres intended for the manufacture of fibreboards and adhering to the upper edge of a partition, are removed by at least one rotating roller provided with radially mounted spikes.

The rotating rollers ensure that fibres do not accumulate on the upper edge of the partitions. If fibres adhere to the edges of the partitions, it may result in non-uniform distribution of fibres in the forming box.

The longitudinal partitions of the forming box may be mounted so as to provide a distance A between partition and forming wire, the size of the distance A being variable between 0% and 100% of the thickness of the fibreboard.

When this distance is greater than 0% of the thickness of the fibreboard, fibres are allowed to form a coherent lower layer on the fibreboard. This layer, together with the heat treatment, contributes to keeping the fibreboard/insulation mat together. At a distance A which is 0% of the thickness of the fibreboard, it is solely the effect of the heat treatment that keeps the fibreboard together around its rupture zones.

The forming box may have longitudinal partitions constructed such that the fibrous tissue on at least one of the outer sides of the fibreboard is not affected by partitions. This provides a coherent fibre layer on at least one side of the fibreboard. This coherent layer and the subsequent heat treatment impart additional stability to the fibreboard/insulation mat.

The forming box may also have transverse partitions constructed such that the fibrous tissue on at least one of the outer sides of the fibreboard is not affected by partitions. This also provides a coherent fibre layer on at least one side of the fibreboard.

Furthermore, the partitions of the forming box may be constructed such that the produced fibrous tissue is formed in two or more independent webs, or in a plurality of independent sections. This means that in some cases a cutting process is no longer necessary. The production apparatus can now merely be adjusted to the desired division. For example, insulation mats may be produced in a finished size without subsequent final trimming of edges or the like.

The longitudinal partitions of the forming box may be adjustable in number and in mutual distance, and the partitions may be adjustable in the direction of their height as well as in the direction of their length. Likewise, the transverse partitions of the forming box may be adjustable in number, in mutual distance and in height. This ensures great flexibility with respect to how the rupture zones may be formed longitudinally of and transversely to the fibreboard.

Figure 2:
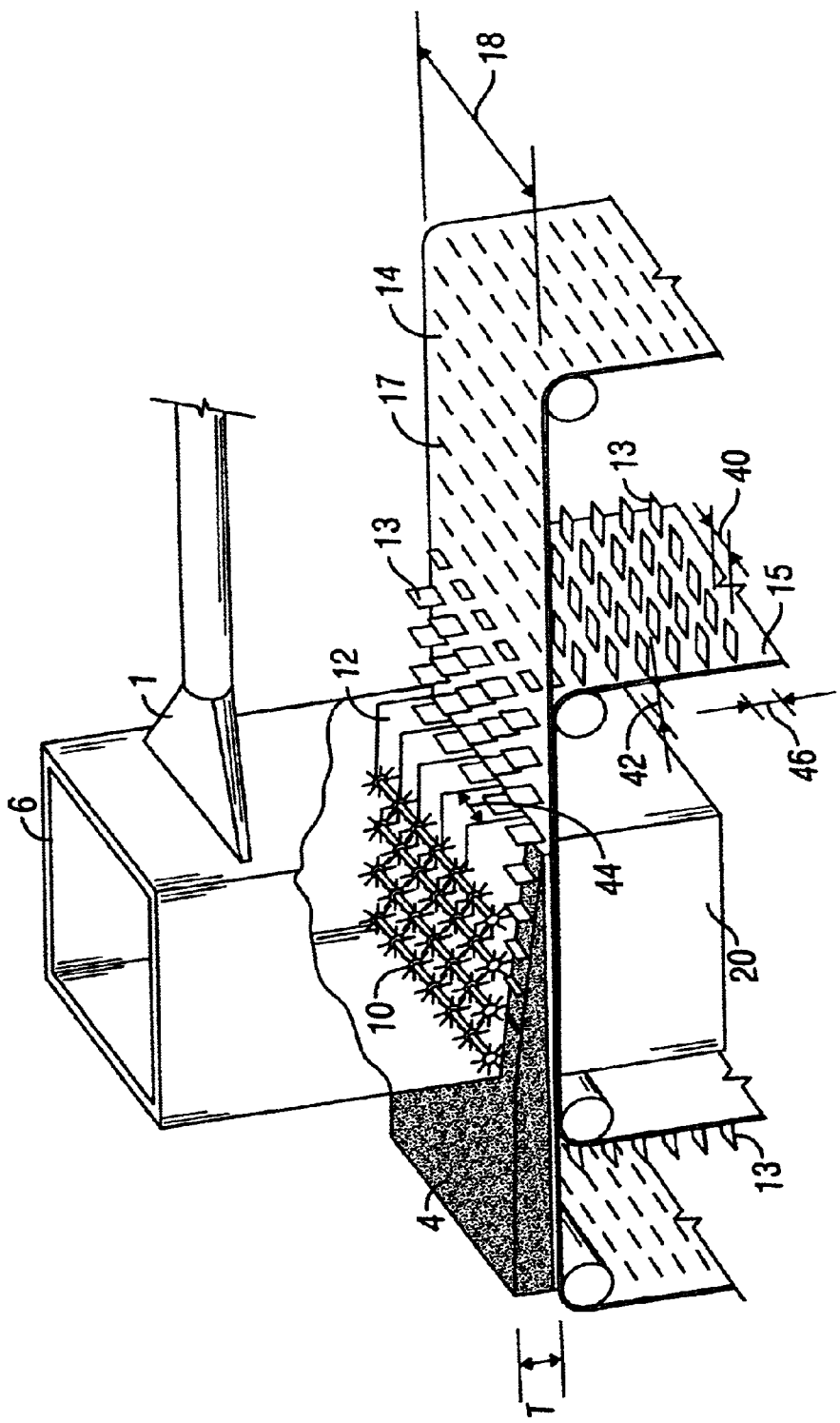
Figure 3:
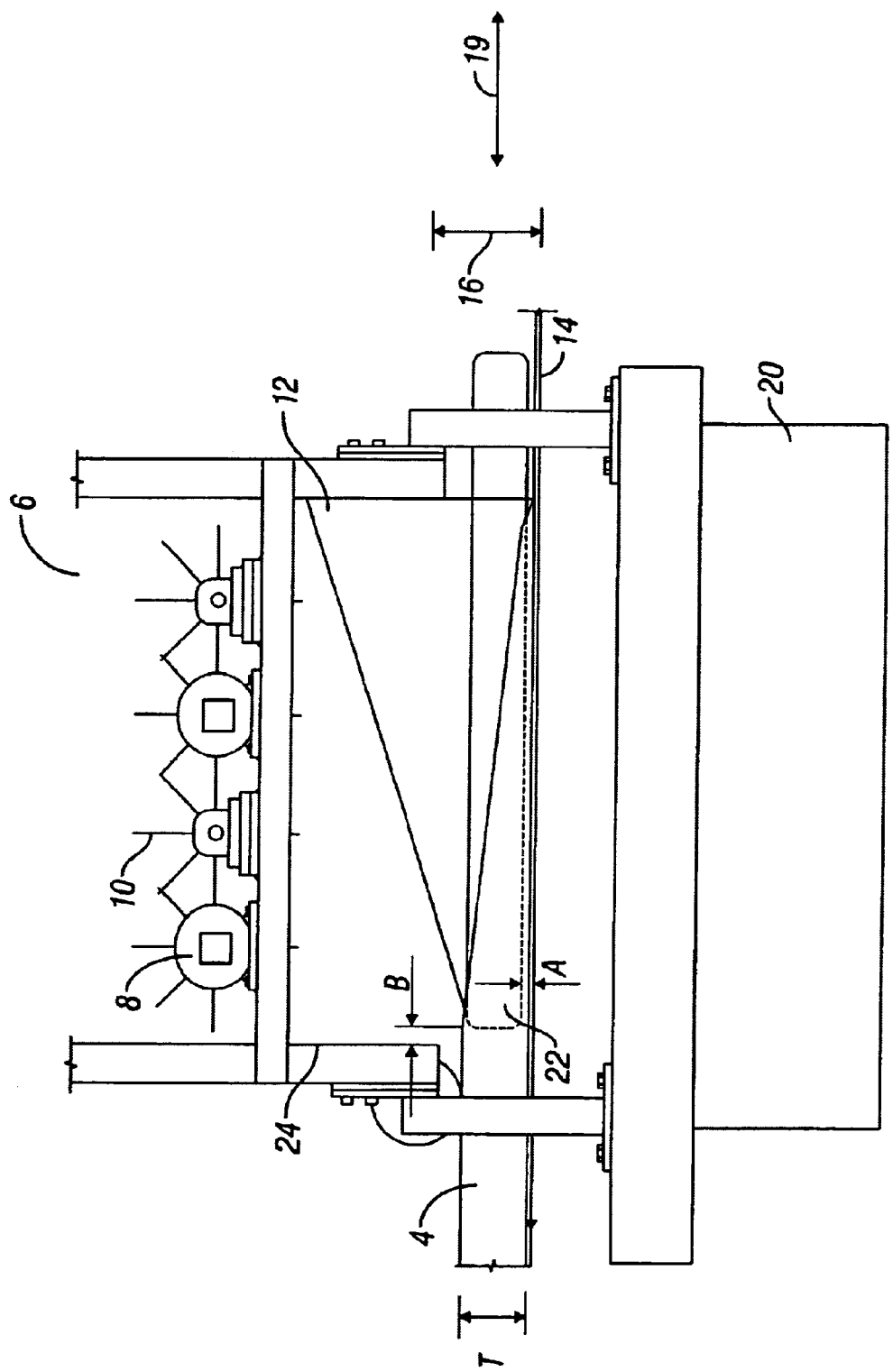
Figure 4:
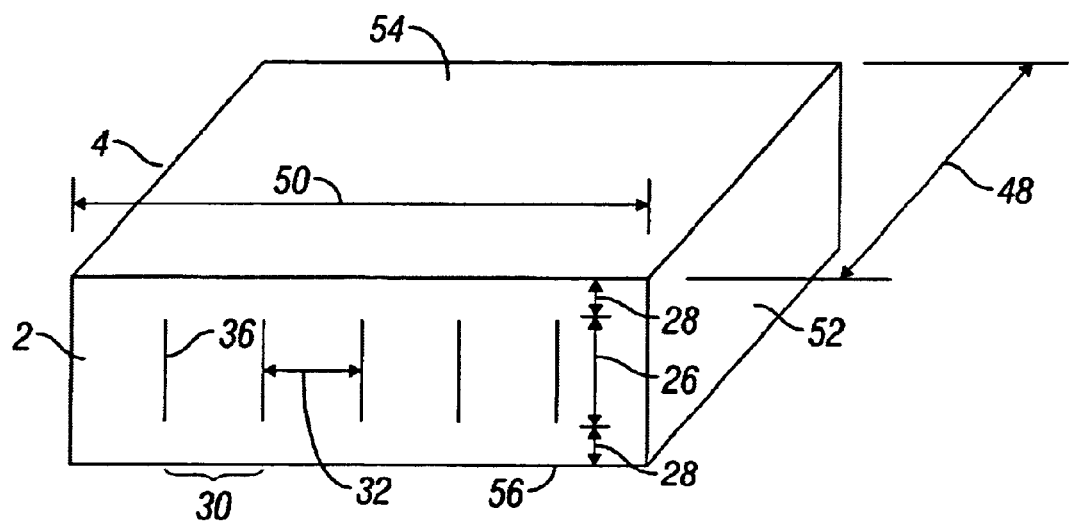
Figure 5:
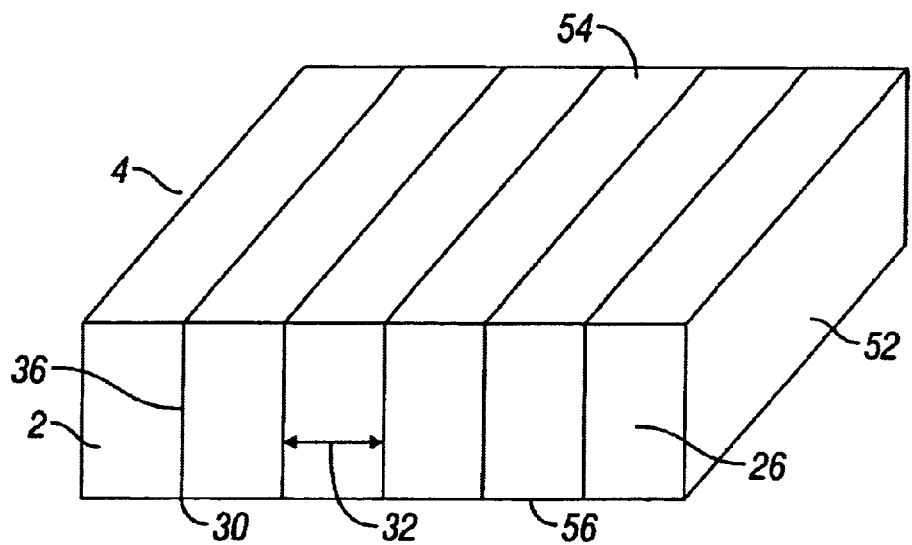
Figure 6:
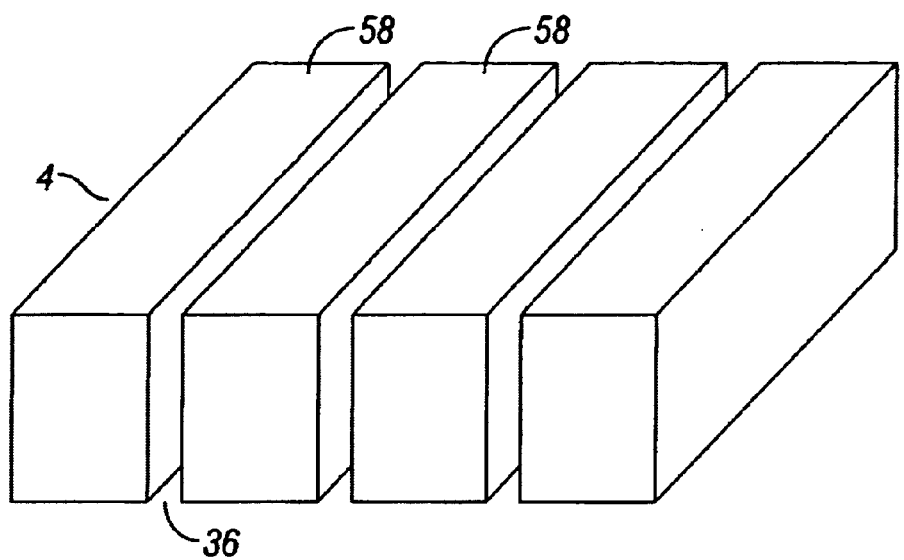
Figure 7:
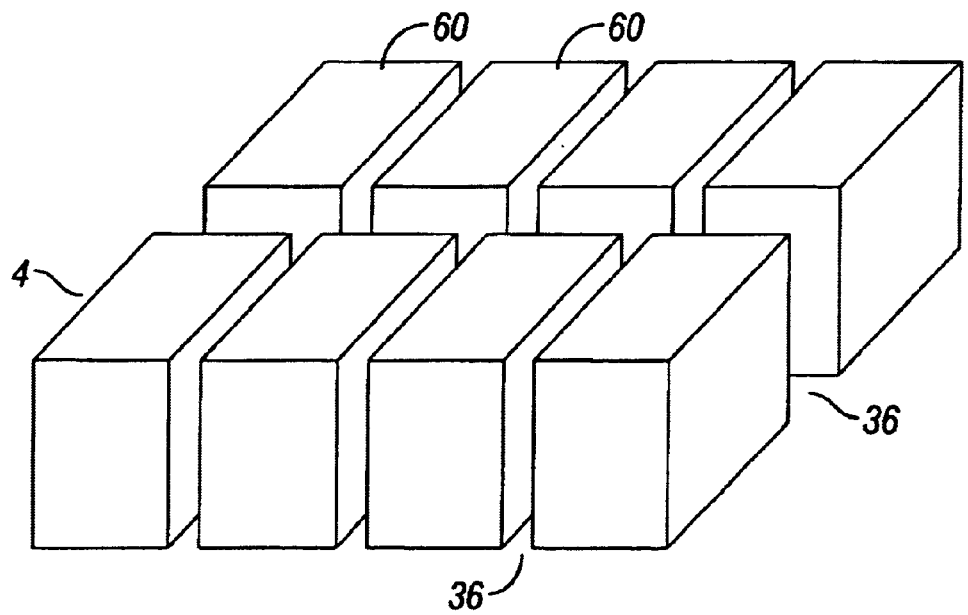

An example of the invention will be explained more fully below with reference to the accompanying drawing, in which FIG. 1 shows an isometric view of a machine for forming fibrous tissue, with longitudinal partitions, FIG. 2 shows an isometric view of a machine for forming fibrous tissue, said machine being equipped with longitudinal as well as transverse partitions, FIG. 3 shows a lateral view of a version of the machine, FIG. 4 shows a cross-section of a product variant, FIG. 5 shows a cross-section of a second product variant, FIG. 6 shows a cross-section of a third product variant, FIG. 7 shows a section-section of a fourth product variant.

FIG. 1 shows a possible embodiment of a machine for the production of a fibrous tissue 2, such as a fibreboard 4 or an insulation mat. The fibres are fed to the forming box 6 in such a manner that they may be distributed by means 8 incorporated in the machine in such a manner that lumps or similar irregularities in the fibres are not formed. In the shown drawing, the machine is provided with rotating rollers 8 on which radially oriented spikes 10 may be mounted. Fibres are fed to the forming box over these rotating rollers 8. The spikes 10 ensure a uniform distribution of fibres in the entire width 18 of the forming box 6. At the bottom of the forming box 6, the machine is provided with a plurality of partitions 12 which extend longitudinally of a forming wire 14. The forming wire 14 is a conveyor belt extending directly below the forming box 6 on which the fibres are fixed by means of an underlying vacuum box 20, which ensures that the fibres are retained on the forming wire 14 and do not whirl around. The partitions 12 may be adjustable in the direction of height 16 as well as in the direction of width 18. The distance A between the lower edge of the partitions 12 and the surface of the forming wire 14 may be varied between 0% and 100% of the thickness T in which the fibreboard 4 is manufactured. Further, the number of partitions 12 is variable.

FIG. 2 is an isometric view of a preferred embodiment of the forming box 6. In the variant shown, partitions 12 are provided longitudinally of the forming wire 14, as shown in FIG. 1, and partitions 13 are moreover provided transversely 18 to the forming wire 14. In the embodiment shown, the transverse partitions 13 are attached to a conveyor belt 15 which runs below the forming wire 14. The lower conveyor belt 15 consists of a carrier face or the like on which transverse partitions 13 are attached in such a manner that the individual transverse rows of partitions 13 may be rotated so that, when introduced into the slots 17 of the forming wire, they are essentially oriented vertically. The conveyor belt 15 with transverse partitions 13 is advanced at the same rate as the forming wire 14. The forming wire 14 is equipped with slots 17 which mate with the transverse partitions 13 that are moved into the slots 17 by a vertical movement. When the transverse partitions 13 have passed through the forming box 6, and the fibreboard 4 has been formed, the partitions 13 are pulled out again likewise by a vertical movement, partly to avoid damaging the produced fibreboard 4, partly to get clear of the forming wire 14. The length of the transverse partitions 13 is adapted to the distance 44 between the longitudinal partitions 12 in such a manner that precisely the desired gap exists between the end of the transverse partition 13 and the side face of the longitudinal partition 12. The pipe stub 1 from which the fibres are fed to the forming box 6, is visible in the side of the upper part of the forming box 6. FIG. 2 moreover shows the movable means, here in the form of rotating rollers 8, which ensure that undesired fibres do not adhere to the upper edges of the partitions 12, 13. If fibres accumulate on the edges of the partitions 12, 13, problems may arise with respect to having the fibres distributed evenly, which may cause the fibreboard 4 to get a non-uniform thickness T.

FIG. 3 shows clearly how an embodiment of the longitudinal partitions 12 may be constructed. These partitions 12 are here adjusted to have a small distance A between the lower edge of the partition 12 and the forming wire 14. It will moreover be seen that there is a distance B between the end 22 of the partition and the end wall 24 of the forming box. The distance A between the partition 12 and the forming wire 14 as well as the distance B at the end of the partition 12 means that an undivided fibre layer 28 may be created on both sides of the fibreboard 4. The thickness of these layers may be adjusted by moving the partitions 12 in different directions 16, 19. If an undivided fibre layer 28 is not desired on one side or on both sides of the fibreboard 4, this may be achieved by adjusting the partitions 12 so that they extend right down to the forming wire 14, and optionally so that there is no longer any distance B between the end 22 of the partition and the end wall 24 of the forming box.

FIG. 4 shows the cross-section of a fibreboard 4 with rupture zones 30, said rupture zones 30 being composed of a divided fibre layer 26 without through-going fibres in the rupture zone gap 36, and on both outer sides 54, 56 of the fibreboard 4 there is an undivided fibre layer 28, i.e. with through-going fibres across the rupture zone gap 36. The central layer 26 is divided in given intervals 32. These divisions, which are superposed by the outer undivided fibre layers 28, constitute a rupture zone 30. The fibreboard 4 in FIG. 4 might have been formed with rupture zones 30 perpendicular to the shown ones.

FIG. 5 shows a fibreboard 4 with rupture zones 30, said rupture zones 30 being composed of a divided fibre layer 26 without through-going fibres in the rupture zone gap 36. The fibreboard 4 is provided with several rupture zones 30 with given intervals 32. The fibreboard 4 is coherent as a result of heat treatment in an oven. This variant, too, of the fibreboard 4 might have had rupture zones 30 perpendicular to the shown ones.

FIG. 6 shows a variation of a fibreboard 4 produced according to the invention. Here, the fibreboard 4 is formed in independent webs 58. This variant is produced by means of longitudinal partitions 12, which ensure that there are no coherent fibres in the gaps 36 between the webs 58.

FIG. 7 shows another variation of the fibreboard 4 produced according to the invention. Here, the fibreboard 4 is formed in independent sections 60. This variant is produced by means of longitudinal partitions 12 and transverse partitions 13, which ensure that there are no coherent fibres in the gaps 36 between the individual independent sections 60.

What is claimed is:

1. A fibreboard formed of a fibrous tissue by dry forming in a forming box and with subsequent fixing of fibres by heat treatment in an oven, the fibres are selected from synthetic fibres, natural fibres or a mixture thereof, the fibreboard is comprised of at least one layer of said fibres, the thickness of the fibreboard and the density are adaptable, and the fibreboard has rupture zones perpendicular to the surface of the fibreboard, the rupture zones extend in at least one direction, the rupture zones are comprised of a rupture zone gap having a height of between 10% and 100% of the thickness of the fiberboard, the forming of the fibreboard of a fibrous tissue by dry forming directly provides rupture zones which do not have through-going fibres in the gap of the rupture zone, thereby forming a rupture zone gap without the use of cutting tools, the rupture zone gap further including two sides being bonded to each other to close the gap.

2. A fibreboard according to claim 1, wherein the fibreboard is manufactured with rupture zones which extend in the longitudinal direction of the fibreboard as well as in the transverse direction of the fibreboard.

3. A fibreboard according to claim 1, wherein the fibreboard is manufactured with a given distance between two rupture zones or between the rupture zone and the edge of the fibreboard for a distance of up to half the board width.

4. A fibreboard according to claim 1, wherein the fibreboard is manufactured of natural fibres, the natural fibres being at least one of animal hair, fibres from flax, hemp, jute, ramie, sisal, cotton, kapok, glass, stone, cellulose, newspaper, elephant grass, sphagnum, seaweed, and palm fibres.

5. A fibreboard according to claim 1, wherein the fibreboard is manufactured of synthetic fibres, the synthetic fibres being at least one of polyamide, polyester, polyacrylic, polypropene, and two-component fibres.

6. A fibreboard according to claim 1, wherein the fibreboard is manufactured of a mixture of natural fibres and synthetic fibres.

7. A fibreboard according to claim 1, wherein the fibreboard comprises a fire-resistant substance.

8. A fibreboard formed of a fibrous tissue by dry forming in a forming box and with subsequent fixing of fibres by heat treatment in an oven, the fibres are selected from synthetic fibres, natural fibres or a mixture thereof, the fibreboard is comprised of at least one layer of said fibres, the thickness of the fibreboard and the density are adaptable, and the fibreboard has rupture zones perpendicular to the surface of the fibreboard, the rupture zones extend in at least one direction, the rupture zones are comprised of a rupture zone gap having a height of between 1% and 99% of the thickness of the fiberboard, the forming of the fibreboard of a fibrous tissue by dry forming directly provides rupture zones which do not have through-going fibres in the gap of the rupture zone, thereby forming a rupture zone gap without the use of cutting tools, the rupture zone gap further including two sides being bonded to each other to close the gap.

9. A fibreboard according to claim 8, wherein the fibreboard is manufactured with rupture zones which extend in the longitudinal direction of the fibreboard as well as in the transverse direction of the fibreboard.

10. A fibreboard according to claim 8, wherein the fibreboard is manufactured with a given distance between two rupture zones or between the rupture zone and the edge of the fibreboard for a distance of up to half the board width.

11. A fibreboard according to claim 8, wherein the fibreboard is manufactured of natural fibres, the natural fibres being at least one of animal hair, fibres from flax, hemp, jute, ramie, sisal, cotton, kapok, glass, stone, cellulose, newspaper, elephant grass, sphagnum, seaweed, and palm fibres.

12. A fibreboard according to claim 8, wherein the fibreboard is manufactured of synthetic fibres, the synthetic fibres being at least one of polyamide, polyester, polyacrylic, polypropene, and two-component fibres.

13. A fibreboard according to claim 8, wherein the fibreboard is manufactured of a mixture of natural fibres and synthetic fibres.

14. A fibreboard according to claim 8, wherein the fibreboard comprises a fire-resistant substance.

* * * * *